US006442576B1

(12) United States Patent
Edelman et al.

(10) Patent No.: US 6,442,576 B1
(45) Date of Patent: *Aug. 27, 2002

(54) SEARCHING FOR DOCUMENTS WITH MULTIPLE ELEMENT TYPES

(75) Inventors: Bradley A. Edelman, San Francisco; William Kraus, Moss Beach, both of CA (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/906,811

(22) Filed: Aug. 6, 1997

(51) Int. Cl.⁷ ................................................ G06F 15/00
(52) U.S. Cl. ...................................... 707/513; 707/500
(58) Field of Search ............................... 707/513, 1–6, 707/100, 104, 500, 516, 8; 709/200–203, 217, 219; 364/131, 146, 150

(56) References Cited

U.S. PATENT DOCUMENTS

| | | | |
|---|---|---|---|
| 5,475,805 A | | 12/1995 | Murata |
| 5,495,565 A | | 2/1996 | Millard et al. ............... 395/147 |
| 5,649,186 A | | 7/1997 | Ferguson .................... 395/610 |
| 5,826,258 A | * | 10/1998 | Gupta et al. .................... 707/4 |
| 5,862,325 A | * | 1/1999 | Reed et al. ............. 395/200.31 |
| 5,890,171 A | * | 3/1999 | Blumer et al. ............... 707/501 |
| 6,119,135 A | * | 9/2000 | Helfman ..................... 707/513 |

FOREIGN PATENT DOCUMENTS

| | | |
|---|---|---|
| EP | 0 394 630 A | 10/1990 |
| EP | 0 661 650 A | 7/1995 |

OTHER PUBLICATIONS

Nisus Software Inc., Solana Beach, CA, "Nisus Writer, The Powerful Word Procesor", 12/97, 33 pgs.

Board of Trustees of the University of Illinois, National Center for Supercomputing Applications, "A Beginner's Guide to HTML/NCSA", 1/97.

Brooks, K. P.: "Lilac: A Two–View Document Editor", Computer US, IEEE Computer Society, Long Beach, CA., vol. 24, No. 6, Jun. 1, 1991, pp. 7–19.

Tamer Oezsu M. et al.; "An Object–Oriented Multimedia Database System for a News–On–Demand Application", Multimedia Systems, DE, Springer Verlag, vol. 3, No. 5/06, Nov. 1, 1995, pp. 182–203.

* cited by examiner

*Primary Examiner*—Hosain T. Alam
*Assistant Examiner*—Alford W. Kindred
(74) *Attorney, Agent, or Firm*—Fish & Richardson P.C.

(57) ABSTRACT

An apparatus and a method perform search operations on a document having nested elements of varying types. The apparatus finds in the document an element which is capable of containing nested elements of one or more varying types. The apparatus can also replace the found element with a substitute element, which is also capable of containing nested elements of one or more varying types. The types of elements include texts, images, animation, and sound clips. For each element, a matching function and a find function are provided. The matching function associated with one element determines if a target element matches itself based on predetermined search criteria. The find function associated with one element searches for a match of a target element within itself. The find function of one element can in turn invoke find functions associated with elements embedded within itself in carrying out the search on the target element.

25 Claims, 14 Drawing Sheets

```
<HTML>
<HEAD>
<META NAME="GENERATOR" CONTENT="Adobe PageMill 2.0 Win">
<TITLE>Untitled Document</TITLE>
</HEAD>
<BODY>
<IMG SRC="EWLogo.gif" WIDTH="72" HEIGHT="73" ALIGN="BOTTOM"
NATURALSIZEFLAG="3"> one <FONT SIZE=+2>two</FONT> <FONT
SIZE=+3>three</FONT>
</BODY>
</HTML>
```
100
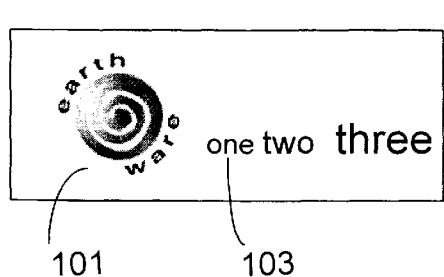
102
101   103
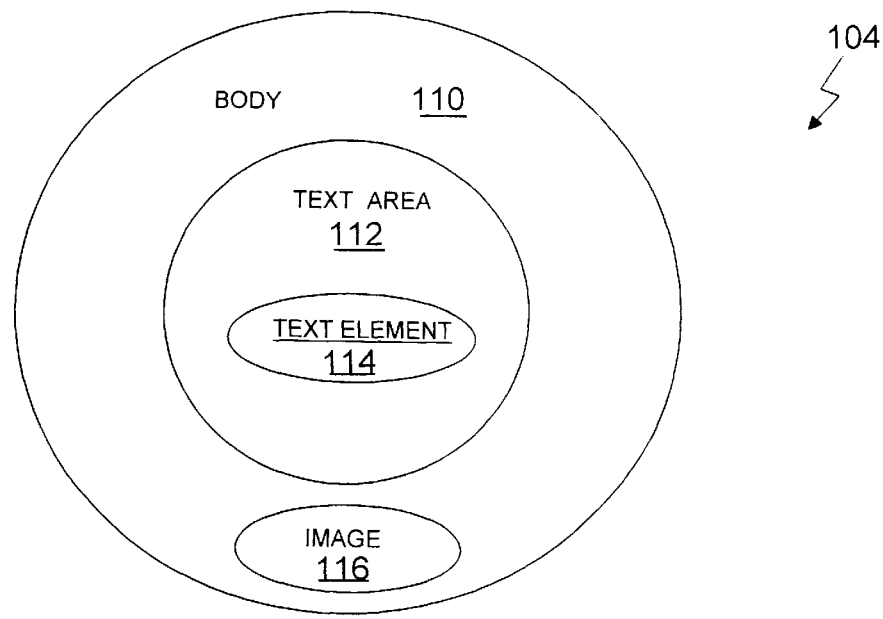
104
FIG. 1

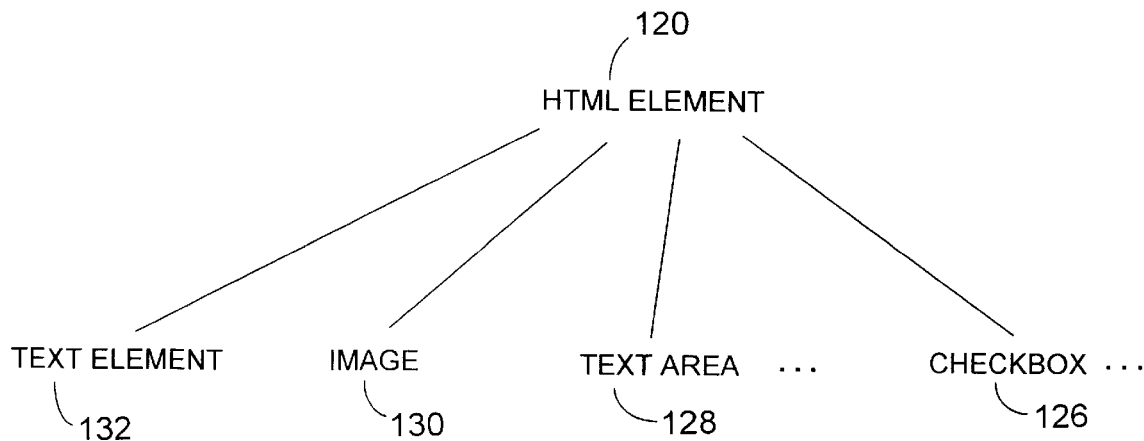

FIG. 2

```
Boolean Image::IsMatch (HTMLElement other, Search Bundle bundle)
{
    //consult the base class
    if (not HTMLElement::IsMatch (other, bundle)) return false //because the base class returned TRUE, element is an Image
    (Image) otherImage = (Image)other //compare the images
    if (my URL is different than otherImage's URL) return false //compare the image sizes, if necessary
    if (bundle.IsSizeSensitive() and my size is different than
    otherImage's size) return false // all tests passed, so the elements do match
    return true
}
```

FIG. 4

```
Boolean TextElement::IsMatch (HTMLElement other, SearchBundle bundle)
{
    // consult the base class
    if (not HTMLElement::IsMatch (other, bundle)) return false // because the base class returned TRUE, element is a TextElement
    TextElement otherText = (Image)other // to be a Match, the lengths must be the same
    if (my length is not the same as otherText's length)
        return false // if my (our) lengths are zero, then we match
    if (my length is zero) return true // now I must decide if my text and the other text match
    // based on the search constraints. I rely on another function
    // called FindString (Fig.5)
    if (FindString(element, bundle, o)) return true return false
}
```

```
Match TextElement::Find (HTMLElement element, SearchBundle bundle, InsertionSpecifier start)
{
    for (n = start; n < my length; n++){
        // see if element is a TextElement that is a substring of ourselves
        // at this starting point
        if (FindString(element, bundle,n) return a match Glyph x = my glyph at index start
        If (x is an embedded element) {
            HTMLElement a = x.GetElement()

// see if element can be found inside of the embeddedelement
            Match result = a.Find(element,bundle,TInsertionSpecifier(0));
            if (result is not none) return result // see if element is a direct match of the embedded element if
            (a.IsMatch(element,bundle)) return a match
        }
    }
    return none
}
```

FIG. 5

```
Boolean TextElement::FindString(HTMLElement element, SearchBundle bundle,
InsertionSpecifier start)                                                180
{
    // make sure element is a TextElement
    if (element is not a TextElement) return false;

// make sure element could fit inside me - if it doesn't fit, it's can't be there
    if (element is too long to fit
    //within me beginning at start) return false // if it's a "whole word" search, make sure that there's
    // a "break" character at the appropriate spot
    if (bundle.IsWholeWord()and there is not a break character at the right spot)return
    false;

// compare glyph by glyph
    for (n=0; n < length of element; n++) {
            Glyph x = my glyph at index start +n
            Glyph y = element's glyph at index n If (x and y are both embedded elements){
                    HTMLElement a = x.GetElement()
                    HTMLElement b = y.GetElement()
                    If (not a.IsMatch(b, bundle)) return false
            } else if (x and y are both alphanumeric) {
                    Character a = x.GetCharacter()
                    Character b = y.GetCharacter()
                    If (not bundle.IsCaseSensitive()){
                            Make a and b lowercase
                    }
                    if (x and y are not the same character) return false
            } else {
                    return false
            }
    }
    // compare text styles if necessary
    if (bundle.IsStyleSensitive() and my relevant styles don't match element's styles)
    return false // all tests succeeded - this string was found at this position
    return true
}
```

FIG. 6

SEARCHING FOR DOCUMENTS WITH MULTIPLE ELEMENT TYPES

BACKGROUND OF THE INVENTION

The invention relates to apparatus and process for editing a document with multiple classes of elements, and particularly, to apparatus and process for searching and replacing items in a document with embedded or nested elements.

The Internet is becoming an increasingly popular medium for communicating and publishing widely accessible documents. A network of networks, the Internet transfers information using a common protocol which tells computers connected to the network how to locate and exchange files with one another. Documents communicated over the Internet generally conform to a Hyper Text Markup Language (HTML) that a World-Wide-Web (WWW or Web) browser can translate and display. Once posted on a Web server, these documents or compilations of pages can be retrieved and viewed by anyone who has access to the Internet.

Each document is essentially a collection of HTML codes or tags which provide the document with a general structure of a head and a body, as well as headings, format controls, forms, tables, and one or more element types. The head contains a title, while the body contains information actually displayed. The body can be made up of a number of elements such as texts, images, sound clips and tags for forming controls, lists, tables, frames, layers, and others. A sample HTML document which displays an image and a string "one two three" in an increasing font size for each word in the string is as follows:

```
<HTML>
<HEAD>
  <TITLE>SAMPLE</TITLE>
</HEAD>
<BODY>
<IMG SRC="EWLogo.gif" WIDTH="72" HEIGHT="73"
  ALIGN="BOTTOM" NATURALSIZEFLAG="3"> one
  <FONT SIZE=+2>two</FONT> <FONT SIZE=+3>three</FONT>
</BODY>
</HTML>
```

Even for this relatively small document with one image element, three text elements and formatting elements, the HTML codes in the document are complicated. Not surprisingly, even though many people use the Internet daily, only a fraction can compose HTML documents without appropriate tools.

A basic familiarity with HTML codes is only one aspect in the process of creating HTML documents. Another issue relates to the process of editing such documents. Although a conventional next editor or word processor can be used to add HTML markups to the document, such method of composing and editing the HTML document is quite tedious as the process does not allow a user to see the document as actually displayed by the browser. Without a visual feedback, the process of composing and editing the HTML document can be error-prone and inefficient.

Moreover, when the HTML document contains elements other than the usual text and text formatting codes, the process of composing and editing the HTML document can be challenging. For example, if image elements are embedded in the document, the conventional text editor or word processor would reference each image using only its access path and file name. Consequently, the user has to be more careful and more exact in selecting the elements, as the user cannot visually verify that the correct image is being edited. Hence, the difficulty in generating the desired HTML document is increased when non-text elements are embedded in the document. The difficulty is particularly accentuated when elements such as table elements with embedded elements need to be specified.

Additionally, when search or replacement operations are performed on non-text elements, the formulation of such search queries can be daunting. Although each search query can designate the desired elements using access paths and file names, such approach is non-intuitive, tedious and error-prone. Moreover, in the event that the user wishes to specify elements having specific attributes, such as text case, text style, or element size, the search query can become quite unwieldy. In such events, if the conventional text editor or word processor is used, the user has to be intimately familiar with the HTML tags and needs to be unswervingly accurate in entering the HTML tags which include element addresses, element attributes, and HTML specific search terms in the search query. Moreover, in the event that the user wishes to perform wild-card type searches on these elements, a search specification language would be needed to supplement conventional word processors in locating the diverse element types. Thus, the process of searching for elements embedded in the HTML document can be non-trivial, especially when a large number of non-text elements such as images, sound clips and animation sequences are dispersed throughout the HTML document or embedded within elements of the HTML document.

SUMMARY OF THE INVENTION

An apparatus and a method perform search operations on a document with nested elements of varying types. The apparatus finds in the document an element which is capable of containing nested elements of one or more varying types. The apparatus can also replace the found element with a substitute element. The substitute element is also capable of containing nested elements of one or more varying types.

The types or classes of elements include texts, images, animation, and sound clips, among others. For each element, a matching function and a find function are provided. The matching function associated with one element determines if a target element matches itself based on specified search criteria. The find function associated with one element searches for a match of a target element within itself. The find function of one element can in turn invoke find and matching functions associated with elements embedded within itself in carrying out the search. As such, a hierarchical composition of elements can be searched.

One class of element includes image elements where each image element has a Uniform Resource Locator (URL) address. For this class, a default base class find function is used, as the image class does not contain any other elements. However, the image element has an overridden matching function which detects whether a target element belongs to the image class of elements, and if so, checks for matching URL addresses and other attributes such as image sizes.

In a second class relating to text elements, the text element has an overridden matching function which detects whether a target element belongs to the text element class, and if so, checks if the length of the text element matches the length of the target element. The overridden matching function also compares if specified characteristics of the element match corresponding characteristics of the target element. The characteristics checked may include text, font, size, case, and style characteristics. The text element class also has an overridden find function which detects whether an embedded element matches the target element.

Advantages of the invention include the following. The invention allows users to formulate search queries using an intuitive, easy to use process such as a drag and drop procedure, a copy and paste procedure, or a suitable composition procedure to place desired elements into a find dialog without any knowledge of HTML codes or tags. The invention thus supports a "What You See is What You Get" (WYSIWYG) HTML editor without requiring the user to learn the innards of HTML tags. Moreover, the invention provides a search and replace system that can handle documents with embedded or nested element types.

BRIEF DESCRIPTION OF THE DRAWINGS

FIG. 1 is a schematic illustration showing three aspects of a representative HTML document.

FIG. 2 is a schematic illustration of a base element and representative elements that derive from the base element.

FIG. 3 is a pseudo-code listing for a matching function for an image element class.

FIG. 4 is a pseudo-code listing showing a matching function for a text element class.

FIG. 5 is a pseudo-code listing showing a find function for a text element class.

FIG. 6 is a pseudo-code listing showing a FindString function used by the pseudo-code listing of FIG. 5.

DESCRIPTION

Figure 7:
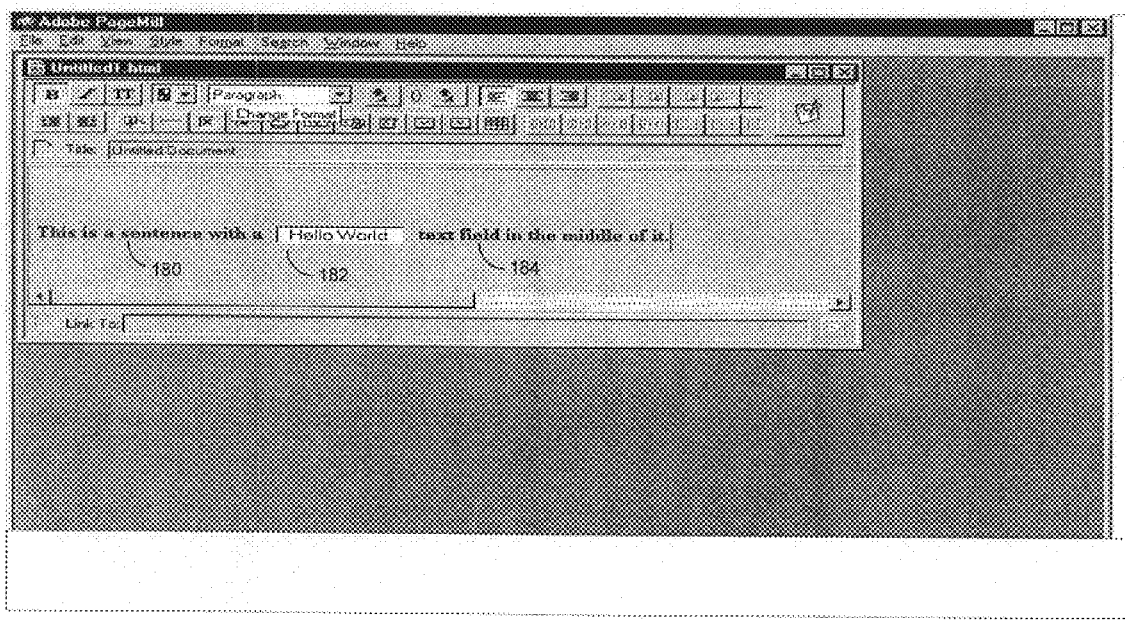
FIG. 7 is an illustration of a representative document having a text field embedded in the middle of a text string.

FIG. 1 illustrates three aspects of a representative HTML document. One aspect of the HTML document of FIG. 1 is a code listing 100 showing tagged image and text elements of the HTML document, as well as HTML tags operative on the formatting of the image and text elements. As shown in the code listing 100, each HTML tag is specified by a left angle bracket (<), a tag name, and a right angle bracket (>). Tags are usually paired, for example <HTML> and </HTML>, to start and end the tag instruction. The end tag resembles the start tag except a slash (/) precedes the text within the brackets.

The HTML listing 100 has two major portions: a head and a body, as delineated by a pair of <HEAD> and </HEAD> tags and a pair of <BODY> and </BODY> tags, respectively. The head provides header information on the document, such as a title and other descriptive information such as a description of the software generating the HTML document.

The body is the primary section where the HTML document is defined. Tags that can appear in the body can designate a formatting of paragraphs, lines, characters, graphics, lists, forms, frames and layers, among others. In this particular example, the body contains tags addressing the placement, alignment and the size of an image element and text elements. Particularly, the text element "one" has a defined relative font size of two, the text element "two" has a defined relative font size of three, and the text element "three" has a defined relative font size of four.

In a second aspect of the HTML document of FIG. 1, the document specified by the HTML code 100 is shown as a page 102. In the page 102, an image 101 is shown adjacent to a text 103. The text 103 in turn has three words, each of which is differentially-sized in accordance with tag instructions specifying that the text element "one" has a relative font size of two, the text element "two" has a relative font size of three, and the text element "three" has a relative font size of four.

In a third aspect of the HTML document of FIG. 1, the HTML code listing 100 is shown as a Venn diagram 104. The diagram 104 shows the HTML document as a composition of instances, including a BODY instance 110. The BODY instance incorporates a Text Area element 112 and an Image element 116. The Text Area element 112 in turn incorporates a Text element 114. Other elements that could be in the BODY instance 110, in addition to the Text element 114 and the Image element 116, include Checkbox elements, Sound elements, Animation elements, and Video elements, among others.

A base class HTML element (HTMLElement) 120 is shown in FIG. 2, as well as a hierarchy of classes of elements which descend from the base class HTML element 120. The base class 120 is a definition of a more generic class, while classes 126–132, derived from the base class 120, define more specific or specialized cases of elements. Thus, the base HTML element 120 is at a root of a hierarchy of element types, each of which is associated with a find (Find) function and a matching (IsMatch) function. Derivatives or descendants of the base HTML element 120 include a Checkbox element 126, a Text Area element 128, an Image element 130, and a Text Element 132, among others.

The functions of the base HTML element 120 implement default behaviors that derivative elements can either inherit or override. Inheritance is used in object-oriented paradigm as a mechanism for creating new classes from an existing class. When a new class of entities is needed which is similar but not identical to an existing class, inheritance is employed to define the new class in terms of the existing class. When inheritance is used to create the new class from an existing class, the derived class obtains access to information and behavior in the base class. Thus, classes can be enhanced or extended in different ways without having to modify existing code.

The implementation of functions leverages a concept in object-oriented programming called polymorphism. Polymorphism allows a base class to define a function that will exist in all classes that inherit from it. Such derived classes have the opportunity to augment or change the behavior of the function, though they may choose to rely on the implementation provided by the base class. Polymorphism is allows the caller to invoke behavior specific to a derived object without knowing the type of that object.

In this case, although the method deals generally with HTML elements, all of the elements the method deals with are derived from the HTML element, none of them are instances of HTML element itself. Thus, polymorphism is leveraged to make a transparent use of the Image element's functions when the element is an Image, and analogously, of the Text element's functions when the element is a Text element. This is done without the method needing to be aware of the element's type. When C++ is the object language, the virtual function mechanism of C++ can be used to implement polymorphism.

Turning now to the functions of the base class HTML element 120, the IsMatch function is a member function of the base class 120 which asks an element if another element matches itself based on specified search criteria. A default implementation of the base class IsMatch function handles the match process in a generic manner. Simply, the elements match if they are of the same class. Most derivative elements extend the test to ensure similarity in other important measures as well. For example, an implementation of the IsMatch function for the Checkbox type 126 may test for similarity among the checkboxes in whether they have been checked or not.

An example pseudo-code for the IsMatch function is shown below:

Boolean HTMLElement::IsMatch(HTMLElement other,
    SearchBundle bundle)
{
    return true if the element being queried is the same
        class as "other" and criteria specified in Search-
        Bundle are satisfied and return false otherwise;
}

In contrast to the IsMatch function, the Find function is a member function which asks an element to search for a match of another element within itself. That is, the Find function does not ask the element being queried if the other element is identical. Rather, the function asks if a match of the target element can be found inside of the element being queried. For example, if the user wishes to search for a text in a document having a Text Field (a form element that contains text), the text would not match the Text Field, but the Text Field could find the text within itself.

A pseudo-code for the Find function is as follows:

Match HTMLElement::Find (HTMLElement element,
    SearchBundle bundle, InsertionSpecifier start)
{
    return none
}

Many element types such as the Image element 130 (FIG. 2) do not contain anything within themselves. Other element types such as Table and Text Field elements do. For these complex elements, the default base class implementations are modified to support the capability for searching elements within themselves.

To better illustrate the implementations of the Find function and the IsMatch function, pseudo-code details are discussed for the Image element and the Text element are discussed next. Turning now to the Image element 130, the default implementation of the Find function suffices because the Image element 130 never contains another element within itself. Hence, the Image element 130 only needs to override or enhance the default IsMatch function.

A pseudo-code listing of an overridden IsMatch function 150 for the Image element 130 is shown in FIG. 3. First, the function 150 consults the base class implementation to ensure that the other element is also an Image element type. The function 150 then compares the underlying Uniform Resource Locator (URL) addresses of the two images, and if necessary, checks for matching attributes such as a size attribute. If everything matches, the function 150 returns a true value and otherwise returns a false value to designate a matching failure.

Turning now to functions supporting the Text element (Text element) 132, pseudo-code listings of an overridden Find function 160 and an overridden IsMatch function 170 for the Text element 132 are shown in FIGS. 4 and 5. Similar to conventional text, the Text element 132 can include a traditional string of characters. Additionally, the Text element 132 can interleave other elements such as images or sound clips within the string of characters. Due to the interleaving of characters and noncharacter elements, in place of conventional treatment of each component of the string as a character, each component of the string is treated as a "glyph", which is either one alpha-numeric character or one non-text element embedded within a conventional alphanumeric text string.

Functions 160 and 170 of the Text element override the base IsMatch and Find functions. FIG. 4 shows a pseudo-code implementation of the IsMatch function 160. First the function 160 consults the base class to see if the element is a Text element. To constitute a match, the function 160 checks that the lengths of both elements are identical. Next, the function 160 decides if its text matches the text of the other element based on various specified search constraints. The function 160 relies on a function called FindString which is described in FIG. 6.

FIG. 5 shows an implementation of the Find function, which is specific to the Text element. The Find function 170 considers text elements one glyph at a time, commencing at a specified starting location. First, the function 170 uses another supporting function called FindString (FIG. 6) to see if the element being searched for is itself a text element that can be found as a substring of itself from the current glyph location. If the FindString function does not report a match, additional checks are made before the function 170 advances to the next glyph. If the current glyph is an embedded element, then two additional tests are made. First, Find is called on the embedded element to see if the element being searched for is contained within the embedded element. If it is, then a match is returned. If not, the IsMatch function (FIG. 4) is called on the embedded element to see if the element being searched for matches the embedded element. If so, a match is returned. Otherwise, the search continues to the next glyph. If all glyphs are checked without finding a match, then a no-match indicator is returned.

FIG. 6 shows a pseudo-code listing of a FindString function 180 invoked in the pseudo-codes of FIGS. 4 and 5. The FindString function 180 is a function used to implement the Find and IsMatch functions specifically for the Text element. The function 180 internally uses the IsMatch function of elements embedded within text. Initially, the FindString function checks if the target element is a Text element type and if the element can fit inside of the element being queried. If not, a match failure is returned.

The function 180 also checks for compliance with various search parameters, including whether the search is a whole-word search. Next, the function 180 compares elements glyph-by-glyph. The function 180 then compares various predetermined attributes, such as element styles if necessary. If all tests succeed, the string is deemed to be found at the current search position and the function 180 completes operation.

Referring now to FIG. 7, an example document is shown and an example execution flow of the system operating on the example document is discussed. The document of FIG. 7 has a plurality of element classes, including a string 180, a text field 182, and a second string 184. The text field 182 is positioned between strings 180 and 184. The text field 182 also contains a text string "Hello World" nested within it. To illustrate the operation of the system on the multi-type document of FIG. 7, a search for a text string "World" nested in the text field 182 is discussed next.

First, an object representative of the document of FIG. 7 receives a request to find the text "World" within itself. As such, the object representative of the document invokes a TextElement::Find function. At this stage, repeated calls to the FindString function fail.

Eventually, after arriving at the letter "a", an embedded element of the type Text Field is encountered. The Find function is invoked on the embedded Text Field element. Because the call is polymorphic and because the embedded element is a Text Field type, the call invokes a TextField::Find function.

As the Text Field element contains another Text element, the Text Field element calls the Find function on the Text element within itself and thus invokes TextElement::Find function. The TextElement::Find function is called recursively such that the first call to the TextElement::Find function operates on the Text element containing the text "This is a sentence . . . ", while the second call operates on the Text element containing the text "Hello World." After several calls to the FindString function, a match is found and the result indicating a match is returned.

Figure 8:
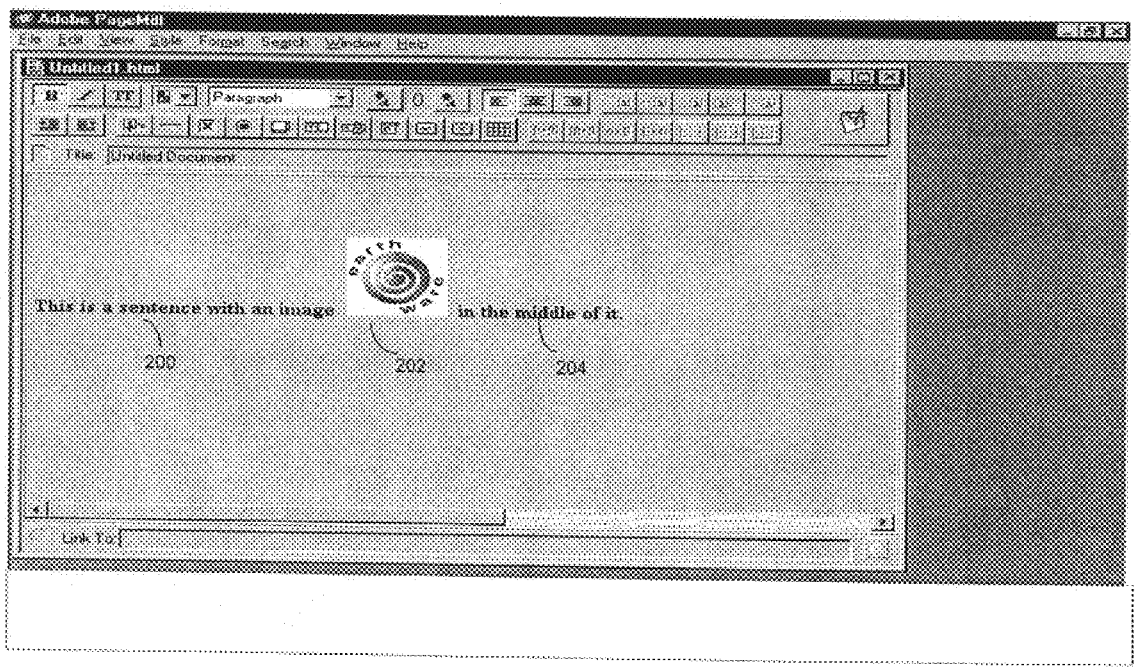
FIG. 8 illustrates a document with a text string and an image embedded in the middle of the text string.

FIG. 8 illustrates a second example involving a search for an Image element class 130. Similar to the previous example, text strings 200 and 204 are positioned between an image element 202, which is of the Image class 130. At this stage, the search parameters are set to their default values denoting that no constraint is to be observed during the search.

At this stage, a message is sent to an object representative of the document of FIG. 8. The message asks the object to find an Image element within itself, starting from the beginning of the document. In response, the object invokes a TextElement::Find function. At this stage, repeated calls to the FindString function fail.

After looking at a letter "e", an embedded element is encountered. The Find function is called on that embedded element. Because the call is polymorphic and the embedded element is of an Image class 130, this call involves an Image::Find function. The invocation fails to return a match.

Next, the IsMatch function is called on the embedded Image element. As the call is polymorphic and the embedded element is an Image element, this call invokes an Image::IsMatch function 216, which is successful. Hence, a message indicating that a match occurred is sent as a reply.

Figure 9:
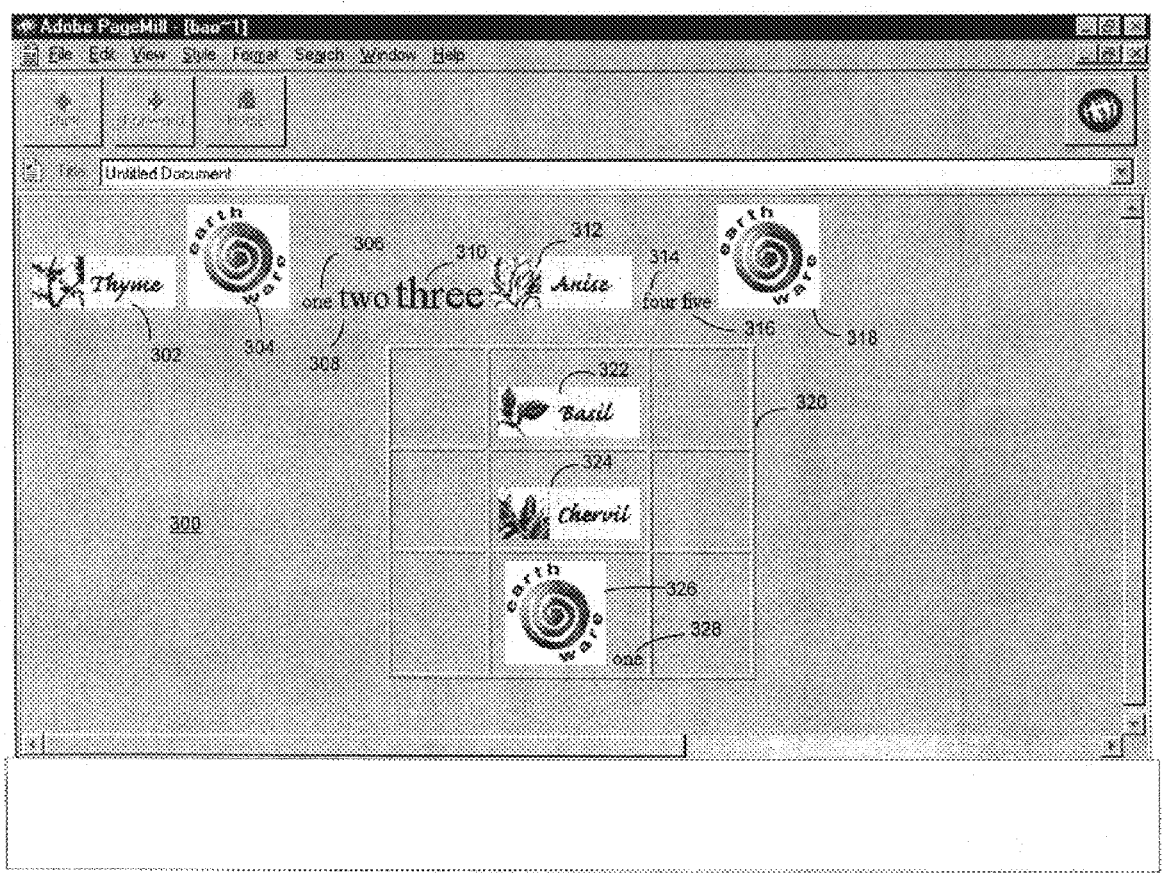
FIG. 9 illustrates a document composed using a WYSIWYG editor having image elements, text elements, and a table element with image elements and text elements embedded therein.

FIGS. 9–15 illustrate additional aspects on the operation of the WYSIWYG HTML editor with the polymorphic find and matching functions. FIG. 9 shows the use of the WYSIWYG editor in composing an HTML-based page 300. In the page 300, a plurality of Image elements 302, 304, 312 and 318 are placed in various locations on the page 300. Additionally, a plurality of text elements 306, 308, 310, 314 and 316 are interspersed within the page 300. Particularly, text elements 306, 314 and 316 are of the same font size. Furthermore, the text element 308 has a font size that is between the font sizes of text elements 310 and 306. Hence, the attributes or characteristics of each of the text 306, 308 and 310 are different with respect to the string as well as the size of the elements. Additionally, the page 300 has a 3×3 table 320 with embedded image elements and text elements. The first row of the center column has an image element 322, while the second row of the center column of the table 320 has an image element 324. The last row of the center column of the table 320 is a composite of an image element 326 and a text element 328.

Figure 10:
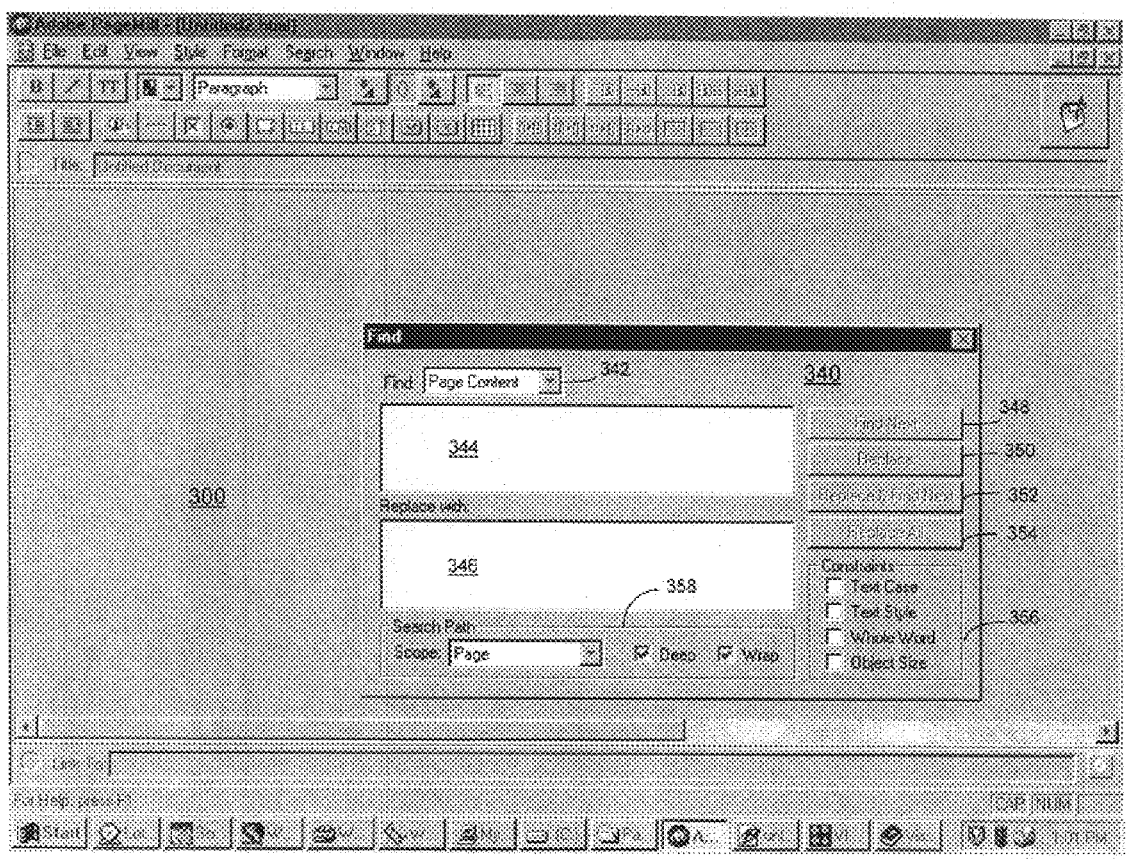
FIG. 10 illustrates a user interface for specifying a search with multiple classes of elements.

Referring now to FIGS. 10 through 15, various operating aspects of the system are illustrated. FIG. 10 illustrates a FIND user interface 340 displayed above the page 300. The FIND user interface 340 has a Find pop up menu 342 which allows a user to select either a page content find operation for searching on contents or a link address find operation for searching only on the URL addresses. The search is invoked with a user specified "link search" option, and the contents of the Find field are searched as a sub-string of an underlying link URL address.

Additionally, an input region 344 is provided to accept a search specifier. Also, a replacement input region 346 is provided for the user to designate a replacement specifier. To accept user operation requests, a plurality of buttons, including a "Find Next" button 348, a "Replace" button 350, a "Replace and Find Next" button 352 and a "Replace All" button 354 are provided to allow the user to select the appropriate find or replace actions. Furthermore, a constraint input region 356 allows user to specify whether the search is to be performed as a case sensitive search, a text style sensitive search, a whole word search, or an object size search. Each of these constraints is a characteristic of the HTML element that can be set as a parameter during the invocation of either the Find function or the IsMatch function. Additionally, a search path input 358 is provided which allows the search to cover the entire page or to be restricted to particular elements such as table elements and form elements. The search can also be performed on a "deep" basis or on a wrap-around basis. The "deep" basis designates that elements nested within other elements are to be included in the search, while the wrap-around basis designates that the search is to be continued at the beginning of the document after the search has reached the end of the document. Wrap-around is achieved by passing bookkeeping information so that, for example, a Text element may stop searching within itself at the original starting point after a "wrap" has occurred on the boundary of the document.

Figure 11:
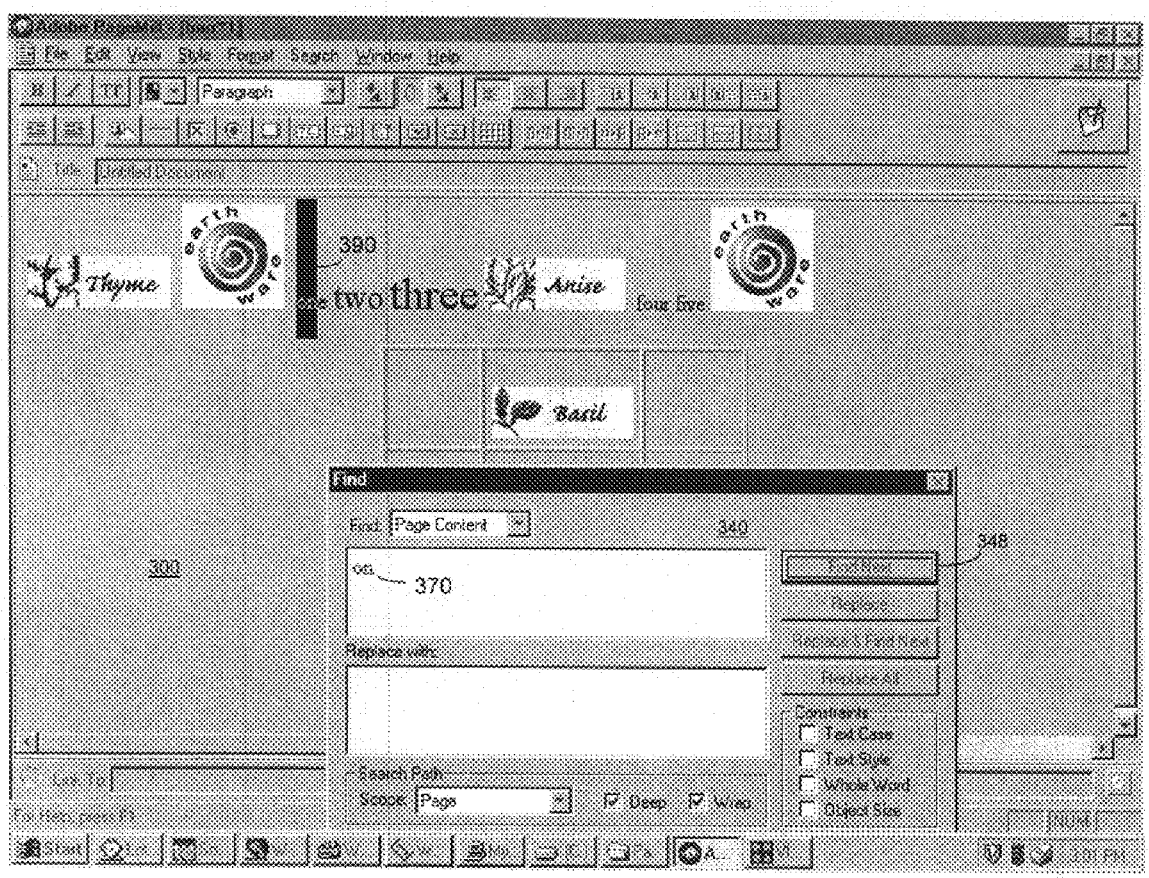
FIG. 11 illustrates a result of searching for a text element in the document of FIG. 9.
Figure 12:
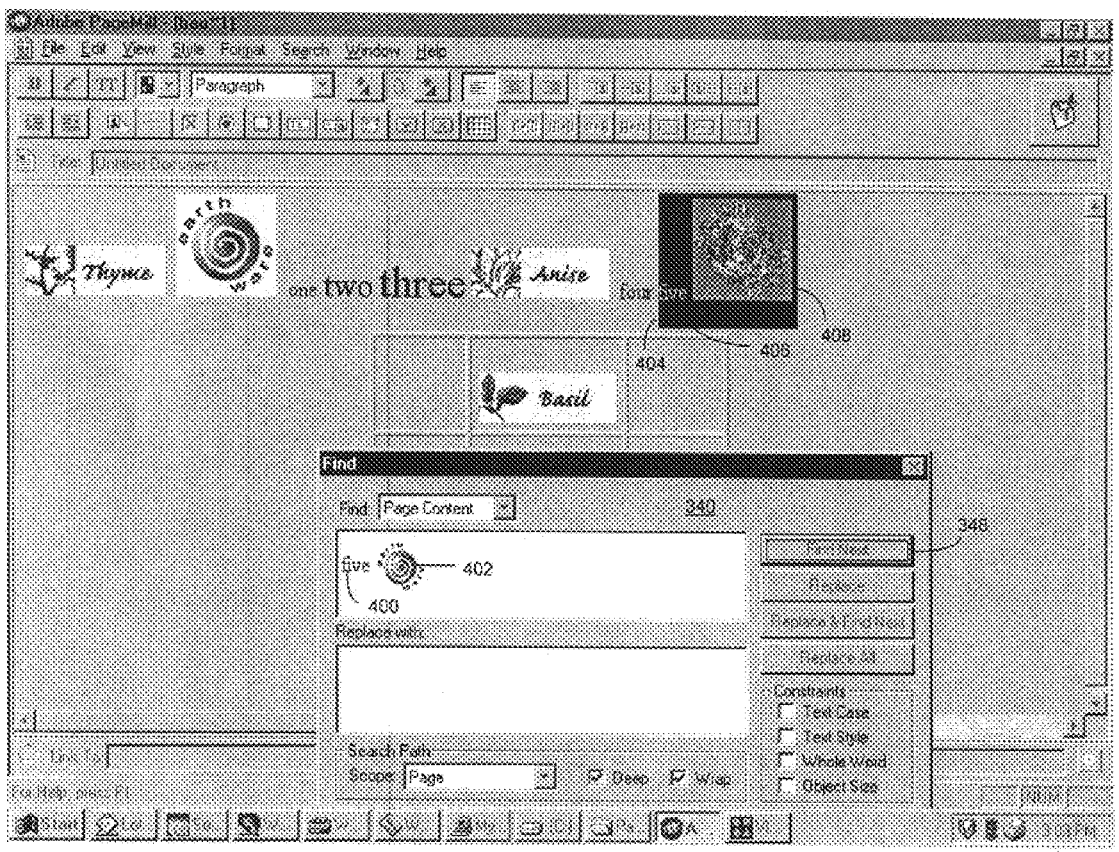
FIG. 12 illustrates a result of searching for a combination of text and image elements in the document of FIG. 9.

FIGS. 11 and 12 illustrate the search operation, as performed by the system. In the Find user interface 340, the user designates a key word 370 with a text "on" as the search specifier. Upon clicking the "Find Next" button 348, the system locates the first instance of "on" as appearing in the initial two characters of the text element "one", as shown in a highlighted section 380 on the page 300. FIG. 11 thus illustrates the operation of the system on a relatively conventional text search.

Referring now to FIG. 12, the operation of the system on a hybrid target consisting of a text element 400 and an image element 402 is shown. Upon entering the search specifier by either pasting, dragging or creating the element into the input region 344, the user clicks on the "Find Next" button 348 to execute the search. Upon performing the search, the engine locates the result of the search in a highlighted box 404 with a matching text element 406 and a matching Image element 408.

Figure 13:
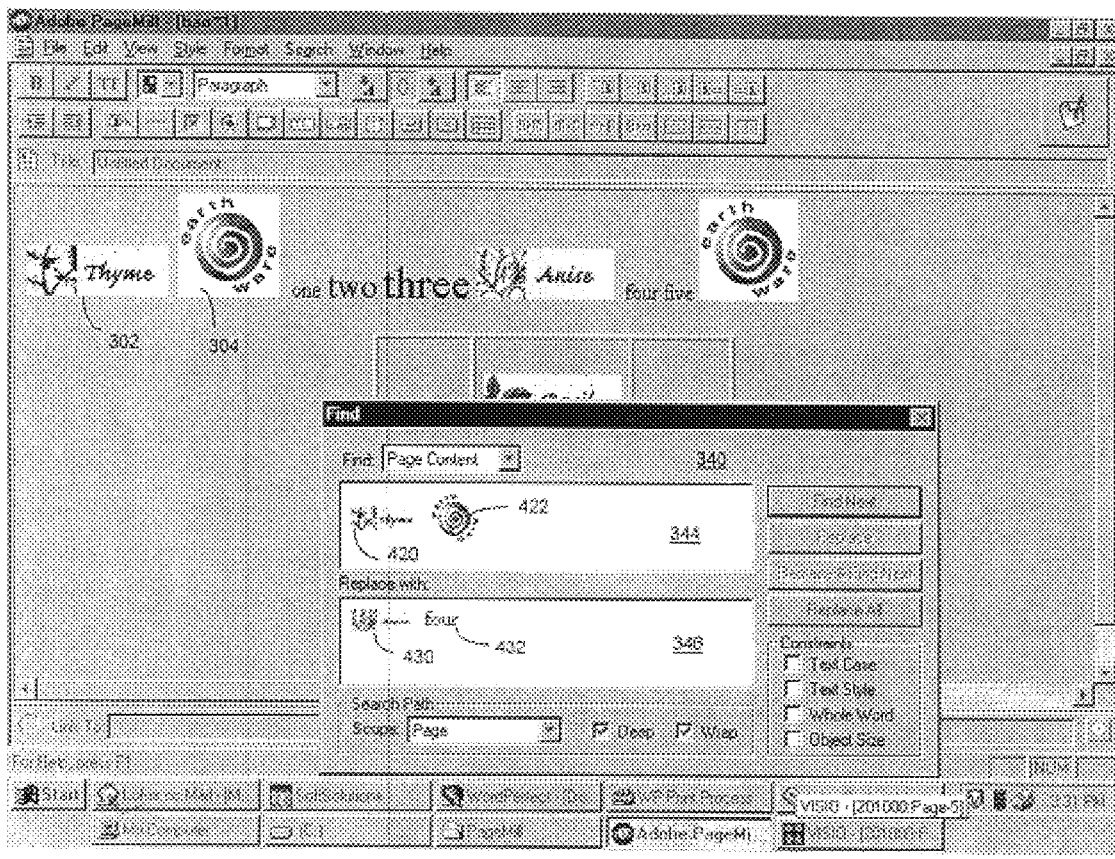
FIG. 13 illustrates a query formulated using the user interface of FIG. 10 for specifying a search and replace operation on element classes in the document of FIG. 9.

FIG. 13 illustrates a search and replace operation using the polymorphic search capability. In the find user interface 340, a plurality of image elements 420 and 422 are positioned in the search specifier area 344. Furthermore, in the replacement specifier area 346, an image element 430 and a text element 432 have been entered by the user to specify that, upon encountering a combination matching Image elements 420 and 422, the editor is to replace Image elements 420 and 422 with the replacement Image element 430 and the text element 432. Further, original Image elements 302 and 304 match Image elements 420 and 422.

Figure 14:
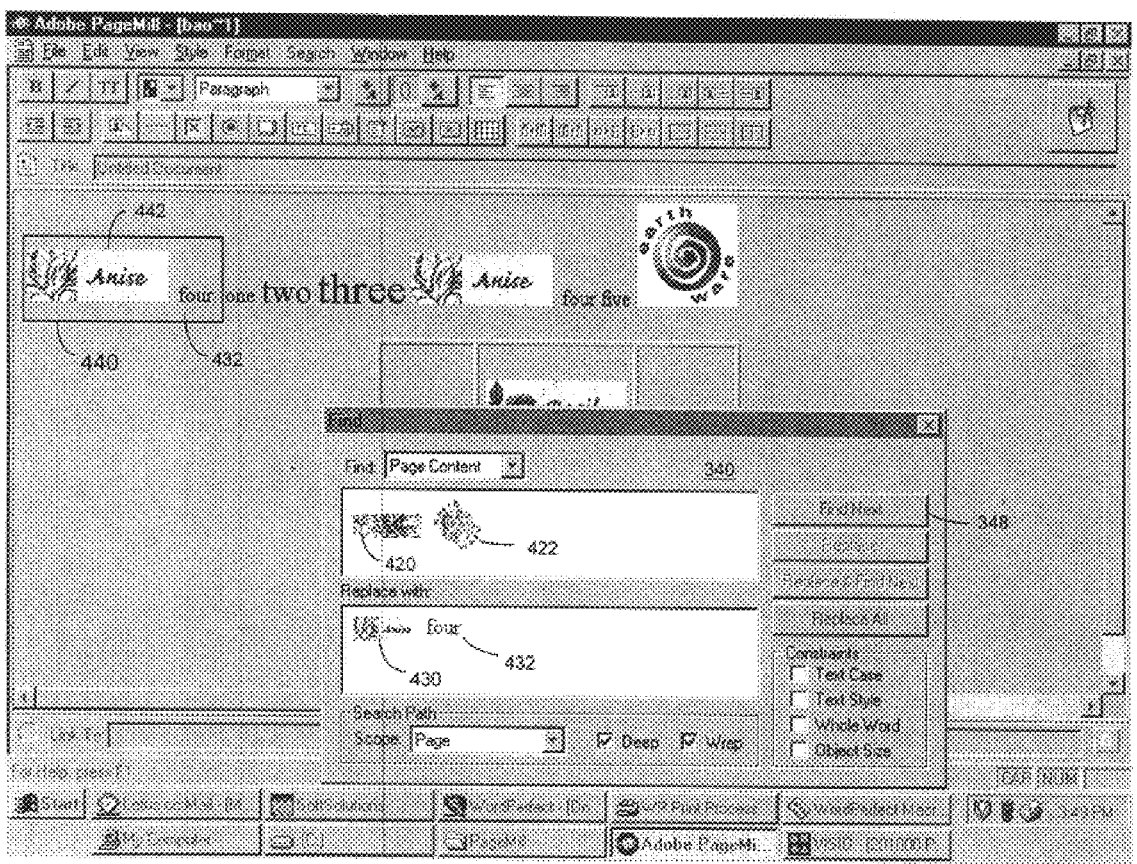
FIG. 14 shows the result of the search and replace operation specified in FIG. 13.

FIG. 14 shows the result of performing the search and replacement operation specified in FIG. 13. In FIG. 14, upon clicking the "Find Next" button 348, original Image elements 302 and 304 are located by the system and subsequently replaced with the replacement Image element 442 and text element 444. After the replacement operation has been performed, the new elements 442 and 444 are enclosed within a bounding box 440 to indicate that the replacement operation has been successfully executed.

Figure 15:
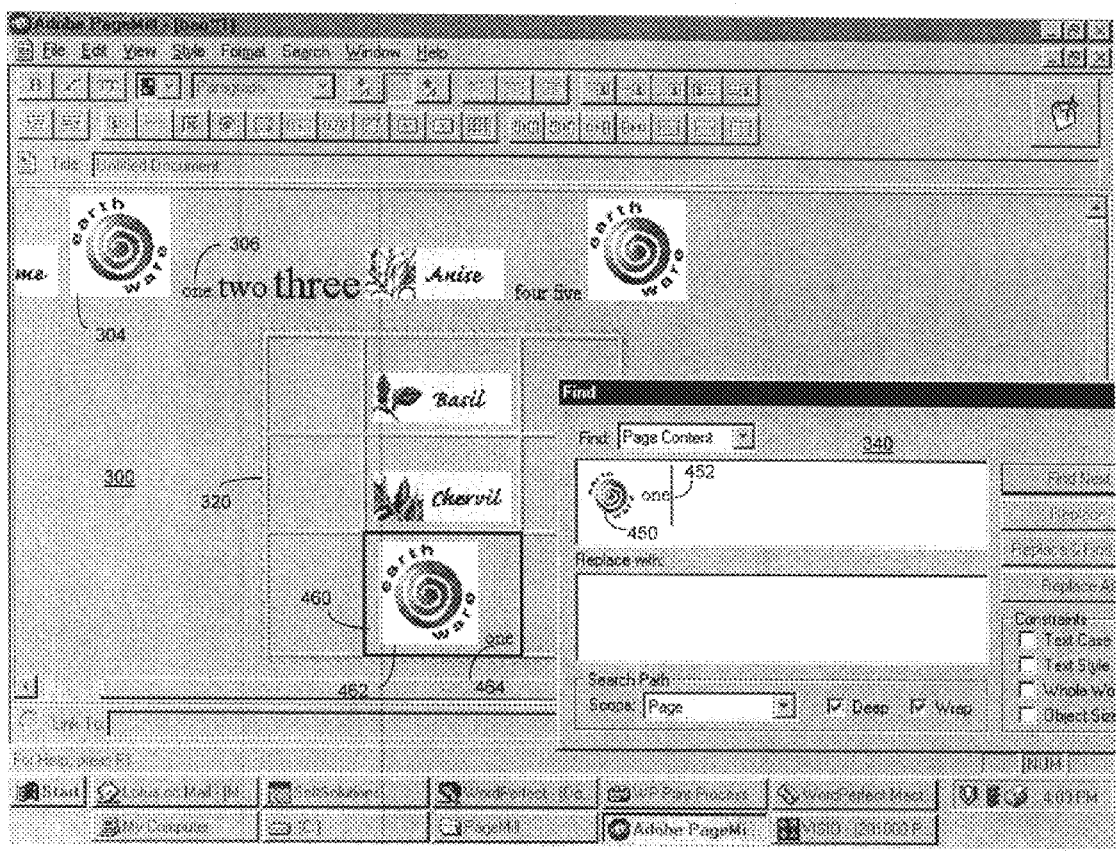
FIG. 15 illustrates the result of a search operation for a combination of an image element and a text element wherein the combination is nested inside of a table element.

FIG. 15 illustrates in more detail the operation of the editor on elements nested within another element, in this case a table element 320. The user has specified as a search specifier an Image element 450 and a text element 452. The first time the search operation is performed, the system locates a combination of the Image element 304 and the text element 306. Upon performing the next search after the text element 306, a second instance matching the search specifier is located on the third row of the center column of the table 300, highlighted as a combination 460 with a matching image icon 462 and a matching text 464. As illustrated, the system flexibly handles search operations on elements embedded, or alternatively nested, within one or more elements.

In this manner, the system allows users to search for and replace any object that can selected-including text, images, movies, sounds, and objects such as form controls, buttons, and links. Any objects can be selected, including embedded objects such as links, form buttons, controls, text, and others. The user can simply drag the selection, copy and paste the selection, or directly compose the selection into the Find dialog box. The selection graphically appears in a miniaturized form to provide a visual feedback to the user. The user can then specify whether the search is to be performed over the entire document, or only on designated objects. Further, the engine accepts search constraints, including the Case constraint to match the case (upper or lowercase) of the selection, the Style constraint to match the typeface style of the selection, the Whole Word constraint to match the selection to occurrences as whole words, and the Object Size constraint to match the size of the original object. Additionally, the user can replace the found selection with something else (text, an image, or others), enter, drag, or copy and paste the replacement item in the "Replace With" text box.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

What is claimed is:

1. A method for searching an electronic document having nested multimedia elements, the method comprising:

representing the electronic document by interpreting markup language defining the electronic document and each nested multimedia element; and in response to inputting a search specifier comprising a selected multimedia element into an input region of a graphical user interface and executing a search command for the selected multimedia element, finding the selected multimedia element in the electronic document, the selected multimedia element capable of containing embedded text or non-text elements.

2. The method of claim 1, further comprising replacing the found multimedia element with a substitute multimedia element, the substitute element also capable of containing embedded text or non-text elements.

3. The method of claim 1, further comprising providing a matching function and a find function for each multimedia element, the find function capable of invoking a second search for a matching text or non-text element embedded within the multimedia element.

4. The method of claim 1, wherein the matching function and the find function apply recursive descent processes.

5. The method of claim 1, further comprising an image class of elements, wherein each element in the image class has a Uniform Resource Locator (URL) address and a matching function, further comprising detecting whether a target element belongs to the image class of elements, and if so, checking if the URL address of the element matches the target element URL address.

6. The method of claim 5, wherein each element in the image class has a size, further comprising checking if the image size of the element matches an image size of a target element.

7. The method of claim 1, further comprising a text class of elements, wherein each element in the text class has a length and a matching function, further comprising:

detecting whether a target element belongs to the text class of elements, and if so, checking if the length of the element matches the target element length.

8. The method of claim 7, wherein each element in the text class has characteristics, further comprising comparing if the characteristics of the element match characteristics of a target element.

9. The method of claim 8, wherein the characteristics include text, font, size, case, and style.

10. The method of claim 5, wherein each element in the text class has a find function, further comprising detecting whether an embedded element matches the target element.

11. The method of claim 1, wherein each multimedia element is represented by an HTML tag.

12. The method of claim 1, wherein the electronic document is a World-Wide-Web page.

13. An editor for editing an electronic document formed as a composition of nested multimedia elements, comprising:

a matching engine for interpreting markup language defining the electronic document and each nested multimedia element and finding a multimedia element nested in the electronic document in response to inputting a search specifier comprising the selected multimedia element into an input region of a graphical user interface and executing a search command for the selected multimedia element; and a find engine for the multimedia element, the find engine capable of invoking a search for a matching text or non-text element embedded within the multimedia element.

14. The editor of claim 13, wherein the matching function and the find function apply recursive descent processes.

15. The editor of claim 13, further comprising an image class of elements, wherein each element in the image class has a Uniform Resource Locator (URL) address and a matching function, further comprising detecting whether a target element belongs to the image class of elements, and if so, checking if the URL address of the element matches the target element URL address.

16. The editor of claim 15, wherein each element in the image class has a size, further comprising checking if the image size of the element matches an image size of a target element.

17. Computer software for a document editing system, the computer software residing on a computer-readable medium and comprising instructions for causing a computer to perform the following operations:

representing the electronic document by interpreting markup language defining the electronic document and each nested multimedia element; and in response to inputting a search specifier comprising a selected multimedia element into an input region of a graphical user interface and executing a search command for the selected multimedia element, finding the selected multimedia element in the electronic document, the selected multimedia element capable of containing embedded text or non-text elements.

18. The software of claim 17, further comprising instructions to replace the found multimedia element with a substitute multimedia element, the substitute multimedia element also capable of containing embedded text or non-text elements.

19. The software of claim 17, further comprising instructions to provide a matching function and a find function for each element, the find function capable of invoking a second search for a matching text or non-text element embedded within the multimedia element.

20. The software of claim 17, wherein the matching function and the find function apply recursive descent processes.

21. The software of claim 17, further comprising instructions implementing an image class of elements, wherein each element in the image class has a Uniform Resource Locator (URL) address and a matching function, further comprising detecting whether a target element belongs to the image class of elements, and if so, checking if the URL address of the element matches the target element URL address.

22. The software of claim 21, wherein each element in the image class has a size, further comprising checking if the image size of the element matches an image size of a target element.

23. The method of claim 1, wherein inputting the search specifier comprises at least one of pasting the search specifier in the input region, dragging the search specifier into the input region, and creating the search specifier in the input region.

24. The editor of claim 13, wherein inputting the search specifier comprises at least one of pasting the search specifier in the input region, dragging the search specifier into the input region, and creating the search specifier in the input region.

25. The software of claim 17, wherein inputting the search specifier comprises at least one of pasting the search specifier in the input region, dragging the search specifier into the input region, and creating the search specifier in the input region.

* * * * *